United States Patent
Yoo et al.

(10) Patent No.: US 9,117,089 B2
(45) Date of Patent: Aug. 25, 2015

(54) METHOD AND APPARATUS FOR CONTROLLING ACCESS IN A SOCIAL NETWORK SERVICE

(71) Applicant: Foundation of Soongsil University-Industry Cooperation, Seoul (KR)

(72) Inventors: MyungSik Yoo, Seoul (KR); Wenji Quan, Seoul (KR)

(73) Assignee: Foundation of Soongsil Univeristy-Industry Cooperation, Seoul (KR)

( * ) Notice: Subject to any disclaimer, the term of this patent is extended or adjusted under 35 U.S.C. 154(b) by 0 days.

(21) Appl. No.: 14/250,075

(22) Filed: Apr. 10, 2014

(65) Prior Publication Data

US 2014/0310519 A1    Oct. 16, 2014

(30) Foreign Application Priority Data

Apr. 10, 2013    (KR) .................. 10-2013-0039425

(51) Int. Cl.
| | |
|---|---|
| *G06F 21/00* | (2013.01) |
| *G06F 21/62* | (2013.01) |
| *H04L 29/06* | (2006.01) |
| *H04L 9/08* | (2006.01) |

(52) U.S. Cl.
CPC .......... *G06F 21/6209* (2013.01); *H04L 9/0833* (2013.01); *H04L 63/062* (2013.01); *H04L 63/104* (2013.01)

(58) Field of Classification Search
CPC ........................ H04L 63/062; G06F 21/6209
See application file for complete search history.

(56) References Cited

U.S. PATENT DOCUMENTS

| | | | |
|---|---|---|---|
| 7,930,756 B1 * | 4/2011 | Crocker et al. | 726/27 |
| 8,824,685 B2 * | 9/2014 | Candelore | 380/278 |
| 2003/0142826 A1 * | 7/2003 | Asano | 380/277 |
| 2004/0022390 A1 * | 2/2004 | McDonald et al. | 380/277 |
| 2006/0117378 A1 * | 6/2006 | Tam et al. | 726/3 |
| 2006/0248573 A1 * | 11/2006 | Pannu et al. | 726/1 |
| 2007/0140483 A1 * | 6/2007 | Jin et al. | 380/44 |
| 2008/0183992 A1 * | 7/2008 | Martin et al. | 711/162 |
| 2009/0252330 A1 * | 10/2009 | Patnala et al. | 380/279 |
| 2009/0288150 A1 * | 11/2009 | Toomim et al. | 726/5 |

FOREIGN PATENT DOCUMENTS

KR    2002-0043973 A    6/2002

* cited by examiner

*Primary Examiner* — Morshed Mehedi
(74) *Attorney, Agent, or Firm* — Mintz Levin Cohn Ferris Glovsky and Popeo, P.C.; Kongsik Kim

(57) ABSTRACT

A key-based method for controlling access in a social network service includes: generating a core key and sub keys by segmenting a master key that is unique to a file owner, with the sub keys assigned differently to multiple groups that are divided according to trust level and relationship type; determining the group to which a file requester belongs by using at least one of a friend list of the file requester, a trust level between the file requester and the file owner, and a friend list of the file owner, and distributing a sub key corresponding to the determined group to the file requester, when the file requester requests a key distribution; and determining whether or not access to a file of the file owner is authorized by using the sub key distributed to the file requester and the core key, when the file requester requests the file.

7 Claims, 5 Drawing Sheets

– PRIOR ART –

METHOD AND APPARATUS FOR CONTROLLING ACCESS IN A SOCIAL NETWORK SERVICE

CROSS-REFERENCE TO RELATED APPLICATIONS

This application claims the benefit of Korean Patent Application No. 10-2013-0039425, filed on Apr. 10, 2013, the disclosure of which is incorporated herein by reference in its entirety.

TECHNICAL BACKGROUND

The present invention relates to a key-based method and apparatus for controlling access in a social network service, more particularly to a method and apparatus that can reduce the burden of managing keys for file owners and efficiently manage file access for other users in the context of a social network service.

RELATED ART

A social network service (SNS) refers to a service used for sharing information on the Web. Examples of a social network service may include an online message board service provided at a website, and services such as Facebook and Twitter.

A social network may provide the advantages of rapid transfer and sharing of information, but there is also the risk that the personal information of Internet users or private information of organizations may be leaked. Thus, information security, which may involve security measures for protecting private information of individuals or organizations, is growing in importance.

The requirements for information security include confidentiality, integrity, and availability, among which confidentiality may be regarded as the most fundamental and important requirement. Here, confidentiality means that the sharing of information must be limited to those who are explicitly permitted to access the information by the owner of the information.

FIG. 1 illustrates a key-based procedure for controlling access according to the related art.

As illustrated in FIG. 1, one file owner may have relationships with several other users. The file owner can divide the users into groups that are designated different levels according to the level of trust and the type of relationship with the users, and may generate corresponding access keys for the respective groups.

As in the example shown in FIG. 1, the user groups for a file owner can be divided into four groups (Groups A to D).

The file owner may generate four access keys (Key 1 through Key 4), and may assign Key 1 through Key 4 to users belonging to "Group A", which has the highest level, assign Key 2 through Key 4 to users belonging to "Group B", which corresponds to the next level, assign Key 3 and Key 4 to users belonging to "Group C", and assign only Key 4 to users belonging to "Group D", the lowest level.

As the access keys are thus assigned in a differential manner, users (file requesters) belonging to each group can access the files of the file owner that are permitted access by the corresponding group.

However, if the access keys are assigned differently for each group as in the related art the file owner may have to generate a large number of access keys, and the burden of managing the keys of the file owner may be increased.

Also, since the file owner has to manage the different access keys for each group, there is the hassle of having to reconfigure the access keys for a user who leaves a user group.

Such inconvenience may increase the burden of the file owner, and may not be suitable for a social network environment where speed and user-friendliness are needed.

SUMMARY

To resolve the problem described above, an aspect of the invention is to provide a key-based method and apparatus for controlling access in a social network service that can minimize the burden on the file owner and increase the efficiency of key management.

To achieve the objective above, an aspect of the invention provides a method of controlling access in a social network service, where the method performed at an access control apparatus includes: (a) generating a core key and a multiple number of sub keys by segmenting a master key that is unique to a file owner, with the multiple sub keys assigned differently to a multiple number of groups that are divided according to trust level and relationship type; (b) determining the group to which a file requester belongs by using at least one of a friend list of the file requester, a trust level between the file requester and the file owner, and a friend list of the file owner, and distributing a sub key corresponding to the determined group to the file requester, when the file requester requests a key distribution; and (c) determining whether or not access to a file of the file owner is authorized by using the sub key distributed to the file requester and the core key, when the file requester requests the file.

The access control apparatus can be a file owner terminal, or a service server that is connected over a network with the file owner terminal and a file requester terminal, or both.

The trust level can be calculated by using at least one of the existence and number, of replies and responses to posts made by the file owner, the existence, number, and duration of voice calls, and the existence and number of exchanged messages.

The relationship type can include at least one of a direct contact relationship between the file owner and the file requester and an indirect contact relationship based on a common friend existing in respective friend lists.

The access control apparatus can be a file owner terminal, in which case step (b) can include: receiving a trust level of the file requester over a secure channel from a trust level database and determining the group to which the file requester belongs by using the received trust level, the friend list of the file owner terminal, and the friend list of the file requester, when a key distribution request message is received from a file requester terminal. Here, the key distribution request message can include an ID and the friend list of the file requester.

Step (c) can include receiving a file request message from a file requester terminal, where the file request message can include at least one of a file requester ID, a file owner ID, and a sub key distributed beforehand according to the trust level and the relationship type with respect to the file owner.

Another aspect of the invention provides a recorded medium which is readable by a computer, and which tangibly embodies a program of instructions for performing the method described above.

Yet another aspect of the invention provides an apparatus for controlling access in a social network service that includes: a key generation part configured to generate a core key and a multiple number of sub keys by segmenting a master key unique to a file owner, with the multiple sub keys assigned differently to a multiple number of groups divided according to trust level and relationship type; a key distribution part configured to determine the group to which a file requester belongs by using at least one of a friend list of the file requester, a trust level between the file requester and the file owner, and a friend list of the file owner, and distribute a sub key corresponding to the determined group to the file requester when the file requester requests a key distribution; and an authentication part configured to determine whether or not access to a file of the file owner is authorized by using the sub key distributed to the file requester and the core key, when the file requester requests the file.

According to certain embodiments of the invention, a master key and sub keys may be utilized to increase the efficiency of authorizing file access for different groups.

Additional aspects and advantages of the present invention will be set forth in part in the description which follows, and in part will be obvious from the description, or may be learned by practice of the invention.

DETAILED DESCRIPTION

Figure 1:
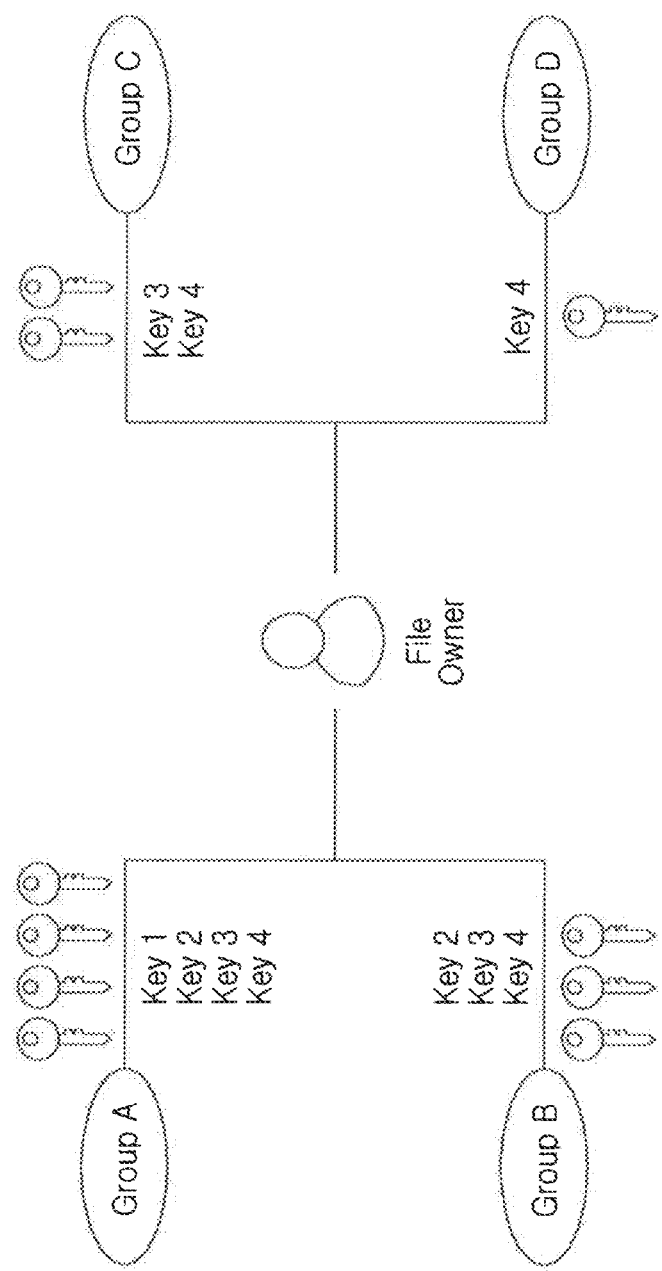
FIG. 1 illustrates a key-based procedure for controlling access according to the related art.

As the present invention allows for various changes and numerous embodiments, particular embodiments will be illustrated in the drawings and described in detail in the written description. However, this is not intended to limit the present invention to particular modes of practice, and it is to be appreciated that all changes, equivalents, and substitutes that do not depart from the spirit and technical scope of the present invention are encompassed in the present invention. In describing the drawings, like reference numerals are used for like elements.

Certain embodiments of the invention will be described below in more detail with reference to the accompanying drawings.

Figure 2:
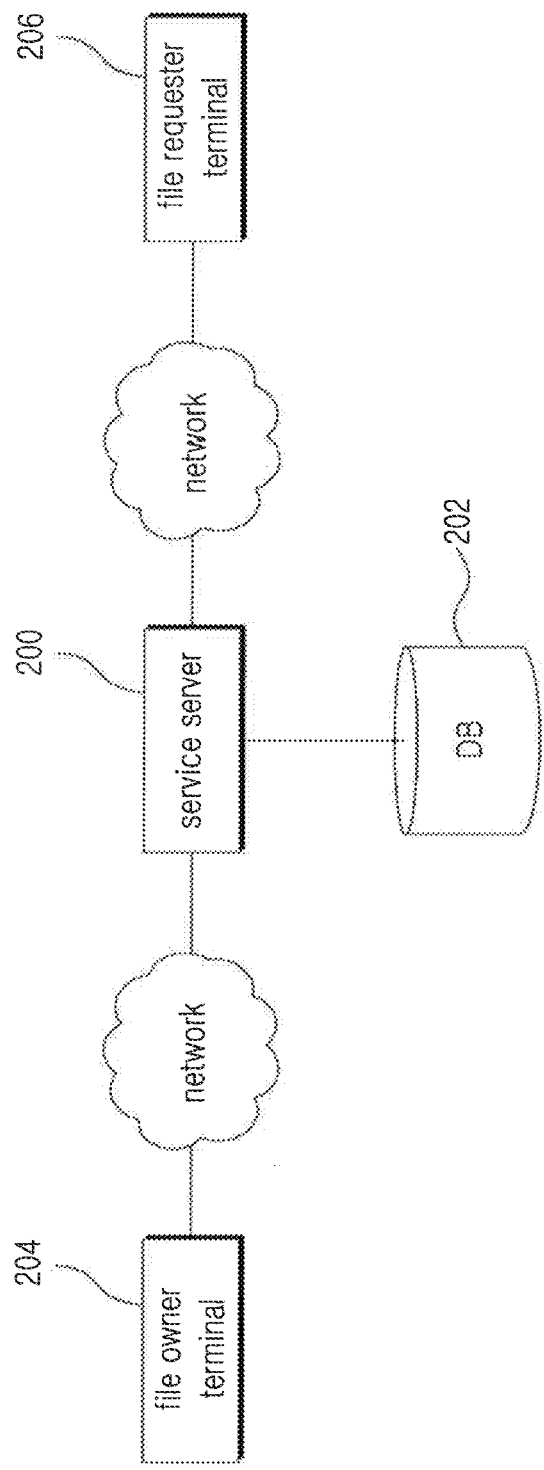
FIG. 2 illustrates a social network service system according to an embodiment of the invention.

FIG. 2 illustrates a social network service system according to an embodiment of the invention.

As illustrated in FIG. 2, a system according to an embodiment of the invention can include a service server 200, a database 202, a file owner terminal 204, and a file requester terminal 206.

The service server 200, file owner terminal 204, and file requester terminal 206 can be connected over a network.

Here, a network can include a wired or wireless connection to the Internet, a mobile communication terminal, and a near-field network.

Each of the file owner terminal 204 and the file requester terminal 206 can be a terminal that connects to a network and runs an application for a social network service, and can include a typical PC, a tablet, a mobile communication terminal, etc.

The service server 200 may provide a social network service to both the file owner and the file requester. The service server 200 may store and manage the personal information, friend list information, and group information of the file owner and the file requester, as well as file the information of each user in the database 202.

The group information may include friend lists of users belonging to certain groups, which may be divided according to a certain set of criteria.

A more detailed description on the dividing into groups will be provided later.

The files can include any type of multimedia content, such as text, pictures, video clips, music clips, etc.

According to an embodiment of the invention, the file owner terminal 204 may interwork with the service server 200 to generate and manage access keys for allowing access to files of the file owner by the file requester, and to perform authentication.

Figure 3:
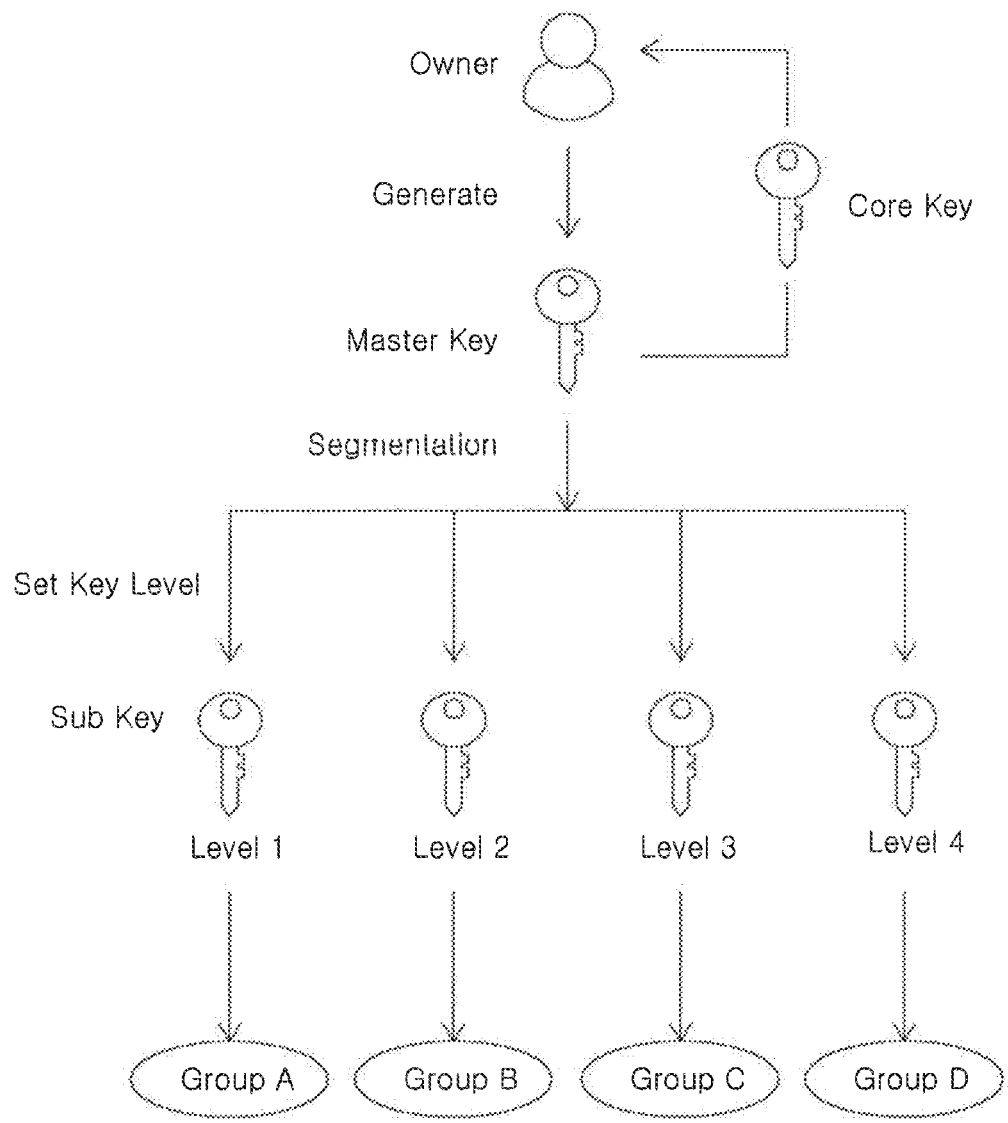
FIG. 3 illustrates a procedure for generating an access key at the terminal of a file owner according to an embodiment of the invention.

That is, the file owner terminal 204 can be the access control apparatus in an embodiment of the invention. FIG. 3 illustrates a procedure for generating an access key at the file owner terminal 204 according to an embodiment of the invention.

As illustrated in FIG. 3, a master key may be generated that is unique to the file owner.

A master key according to an embodiment of the invention can be segmented into one core key and a multiple number of sub keys.

Here, the core key may be kept by the file owner, and the multiple sub keys may be assigned to the respective file requesters, with the sub keys assigned differently to each of the groups according to the trust level or relationship type with respect to the file owner.

The file owner can divide the users into a multiple number of groups having different levels according to trust level or according to the relationship with the file owner.

In FIG. 3, Group A, which has the highest level, can be for users of whom the trust levels are above a first threshold set by the file owner, and may generally include users such as family, co-workers, and school friends that are the most trusted by the file owner. Group A can include users who are friends both online and offline.

Next, Group B can include users of whom the trust levels are between the first threshold and a second threshold, such as users who are friends with the file owner but only friends online, for example.

Group C can include users of whom the trust levels are between the second threshold and a third threshold, such as users who are friends with friends of the file owner, or users who are indirect contacts with the file owner, for example.

Group D can include users of whom the trust levels are between the third threshold and a fourth threshold, such as users who have no direct or indirect contact with the file owner, for example.

According to an embodiment of the invention, the trust levels of users who are direct or indirect contacts with the file owner may be stored in a trust level database 40 (see FIG. 4) that is connected to the service server 200.

The trust level database 40 can be implemented as a part of the database 202 connected to the service server 200.

Of the first to fourth thresholds of trust levels mentioned above, the first threshold can have the highest value. In an embodiment of the invention, a trust level can be calculated according to the existence and number of replies and responses to posts made by the file owner, the existence, number, and duration of voice calls, the existence and number of exchanged messages, and the like.

In cases where the file owner has generated four groups as illustrated above, four sub keys may be generated from the master key, and the sub keys may be distributed differently to users (file requesters) belonging to different groups.

According to an embodiment of the invention, if a file requester having one sub key from among the multiple number of sub keys requests a file, a master key can be generated from the sub key carried by the file requester and the core key carried by the file owner. When the master key is thus generated, the file requester can be authorized access to the file owner's file.

Figure 4:
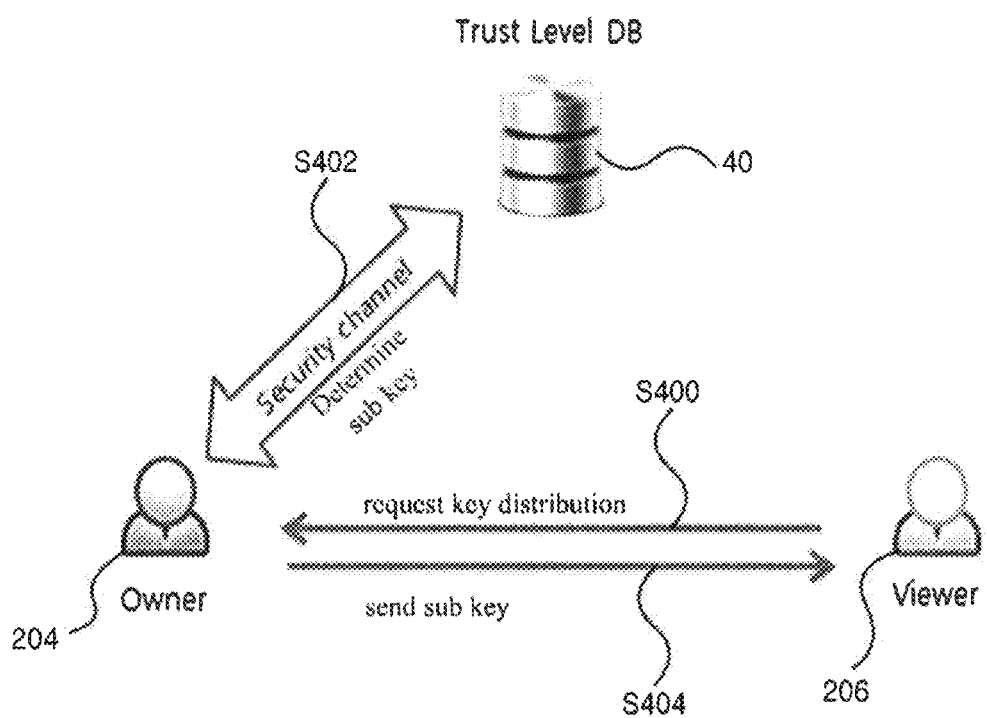
FIG. 4 illustrates a procedure for distributing a key to a file requester according to an embodiment of the invention.

FIG. 4 illustrates a procedure for distributing a key to a file requester according to an embodiment of the invention.

As illustrated in FIG. 4, a file requester terminal 206 according to an embodiment of the invention may send a key distribution request message to the file owner terminal 204 (operation S400).

A key distribution request message according to an embodiment of the invention can be encrypted with a public key of the file requester, and can include the file requester's ID and information on the file requester's friend list.

Upon receiving the message, the file owner terminal 204 may decrypt the key distribution request message by using the public key.

The file owner terminal 204 may request and receive the trust level for the file requester from trust level database 40 through a secure channel (operation S402).

When requesting a key distribution, the file owner terminal 204 may determine the group to which the file requester belongs by using at least one of the file requester's friend list, the trust level between the file requester and the file owner, and the file owner's friend list, and may distribute to the file requester the sub key corresponding to the determined group (operation S404).

Regarding operation S404, if the groups are divided as in FIG. 3, Group A and Group B would be cases where the file requester is included in the file owner's friend list, and thus a sub key corresponding to Group A or Group B may be sent to the file requester terminal 206 according to trust level.

In cases where the file requester's ID does not exist in the file owner's friend list, the file owner terminal 204 may send a sub key corresponding to Group C to the file requester terminal 206 if it is found that the file requester's friend list and the file owner's friend list include a common friend.

If the file requester has a trust level equal to or greater than a certain value but is not a direct or indirect contact of the file owner, then the file owner terminal 204 may transmit a sub key corresponding to Group D to the file requester terminal 206.

After the sub key distribution procedure is completed as above, when a file requester having a sub key corresponding to a particular group requests access to a file, the file requester terminal 206 may send a file request message to the file owner terminal 204.

The file request message can include the file owner's ID and the sub key that was assigned beforehand based on the trust level and relationship type with respect to the file owner.

The file owner terminal 204 may determine whether or not the master key is established using the core key carried by the file owner terminal 204 and the sub key, and if the master key is established, may provide the file requester with an access authorization according to level.

To provide an access authorization according to level means that the file requester is authorized to access the file owner's files in accordance with the file requester's level.

According to an embodiment of the invention, a unique master key may be generated for each file owner, and the master key may be separated/segmented for distribution to the users according to their respective trust levels. Thus, the burden on the file owner of managing keys can be reduced, and the number of keys assigned to the respective groups can also be reduced.

Figure 5:
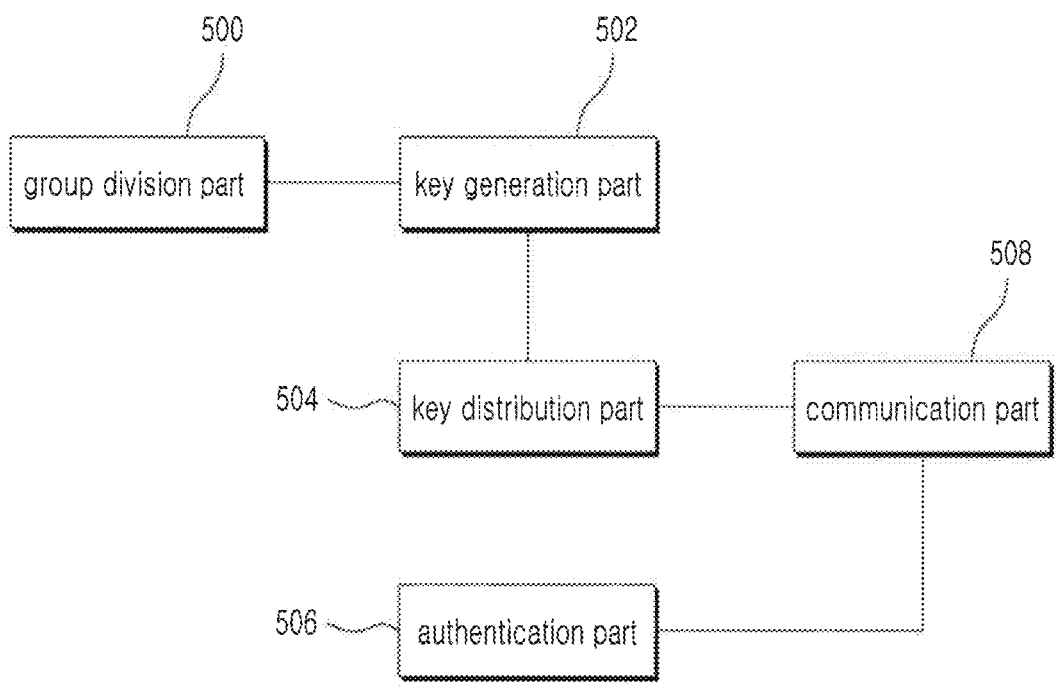
FIG. 5 illustrates the detailed composition of an access control apparatus according to an embodiment of the invention.

FIG. 5 illustrates the detailed composition of an access control apparatus according to an embodiment of the invention.

As already mentioned above, an access control apparatus according to an embodiment of the invention can be a file owner terminal.

As illustrated in FIG. 5, a file owner terminal 204 according to an embodiment of the invention can include a group division part 500, a key generation part 502, a key distribution part 504, an authentication part 506, and a communication part 508.

The group division part 500 may divide users into multiple groups according to the trust level or relationship type between the file owner and the respective other users.

The key generation part 502 may segment a unique master key provided to each file owner to generate a core key and a multiple number of sub keys corresponding respectively to the multiple number of groups.

The key distribution part 504, upon receiving a key distribution request message from a file requester terminal 206, may reference the trust level of the file requester as stored in a trust level database 40, a friend list of the file owner terminal, and a friend list of the file requester, to determine the group to which the file requester belongs, and may then distribute a sub key corresponding to the group thus determined.

The authentication part 506, upon receiving a file request message including a sub key from the file requester terminal 206, may determine whether or not a master key is generated using the sub key and the core key carried by the file owner terminal, and if a master key is generated, may authorize access to the files of the file requester.

The communication part 508 may send and receive messages to and from the file requester terminal 206, may send a sub key, and may communicate with the trust level database 40 over a secure channel when distributing a key, to request and receive the trust level of a file requester who has requested a key distribution.

The descriptions above are provided for an example in which the file owner terminal divides users into groups, distributes a sub key corresponding to the corresponding group according to a key distribution request by a file requester, and determines whether or not the file requester may access files.

However, the present invention is not thus limited, and the procedures for processing accesses can also be performed at a service server 200. That is, the service server 200 can serve as the access processing apparatus.

The overall procedures for the group division, key generation, key distribution, and authentication processing shown in FIG. 5 can be performed by a service server 200 and a trust level database 40 connected to the service server 200.

Here, the service server 200 may manage the friend list of the file owner and the friend lists of file requesters, and may periodically compute the trust levels between the file owner and the file requesters and store them in the trust level database 40.

The service server 200 may provide a unique master key to each file owner, segment the master key to a core key, which is held by the file owner, and a multiple number of sub keys, which are distributed to the file requesters, and may store and manage the keys.

When a file requester requests a key distribution, the service server 200 may determine the group of the file requester by referencing the file requester's ID and friend list, the trust level between the file owner and the file requester, and the file owner's friend list, extract the sub key corresponding to the group thus determined, and send the extracted sub key to the file requester terminal 206.

Later when requesting a file, the file requester terminal 206 may send a file request message to the service server 200, with the file request message including the sub key.

A file request message can include the file owner's ID and the sub key assigned according to the trust level and relationship type with respect to the file owner, and the service server 200 may determine whether or not a master key can be generated from the combination of the core key of the identified file owner and the sub key sent by the file requester. If a master key can be generated, the service server 200 can authorize the file requester terminal 206 to access files.

The embodiments of the present invention described above can be implemented in the form of program instructions that may be performed using various computer means and can be recorded in a computer-readable medium. Such a computer-readable medium can include program instructions, data files, data structures, etc., alone or in combination. The program instructions recorded on the medium can be designed and configured specifically for the present invention or can be a type of medium known to and used by the skilled person in the field of computer software. Examples of a computer-readable medium may include magnetic media such as hard disks, floppy disks, magnetic tapes, etc., optical media such as CD-ROM's, DVD's, etc., magneto-optical media such as floptical disks, etc., and hardware devices such as ROM, RAM, flash memory, etc. Examples of the program of instructions may include not only machine language codes produced by a compiler but also high-level language codes that can be executed by a computer through the use of an interpreter, etc. The hardware mentioned above can be made to operate as one or more software modules that perform the actions of the embodiments of the invention, and vice versa.

While the present invention has been described above using particular examples, including specific elements, by way of limited embodiments and drawings, it is to be appreciated that these are provided merely to aid the overall understanding of the present invention, the present invention is not to be limited to the embodiments above, and various modifications and alterations can be made from the disclosures above by a person having ordinary skill in the technical field to which the present invention pertains. Therefore, the spirit of the present invention must not be limited to the embodiments described herein, and the scope of the present invention must be regarded as encompassing not only the claims set forth below, but also their equivalents and variations.

What is claimed is:

1. A method of controlling access in a social network service, the method performed at an access control apparatus, the method comprising:
   (a) generating a core key and a plurality of sub keys by segmenting a master key unique to a file owner, the plurality of sub keys assigned differently to a plurality of groups divided according to trust level and relationship type;
   (b) determining a group to which a file requester belongs by using at least one of a friend list of the file requester, a trust level between the file requester and the file owner, and a friend list of the file owner, and distributing a sub key corresponding to the determined group to the file requester, when the file requester requests a key distribution; and
   (c) determining whether or not access to a file of the file owner is authorized by using the sub key distributed to the file requester and the core key, when the file requester requests the file,
   wherein step (c) comprises: receiving a file request message from a file requester terminal, the file request message including at least one of a file requester ID, a file owner ID, and a sub key distributed beforehand according to the trust level and the relationship type with respect to the file owner.

2. The method of claim 1, wherein the access control apparatus is at least one of a file owner terminal and a service server connected over a network with the owner terminal and a file requester terminal.

3. The method of claim 1, wherein the trust level is calculated by using at least one of an existence and number of replies and responses to a post made by the file owner, an existence, number, and duration of voice calls, and an existence and number of exchanged messages.

4. The method of claim 1, wherein the relationship type comprises at least one of a direct contact relationship between the file owner and the file requester and an indirect contact relationship based on a common friend existing in respective friend lists.

5. The method of claim 1, wherein the access control apparatus is a file owner terminal, and said step (b) comprises:
   receiving a trust level of the file requester over a secure channel from a trust level database and determining the group to which the file requester belongs by using the received trust level, the friend list of the file owner terminal, and the friend list of the file requester, when a key distribution request message is received from a file requester terminal, the key distribution request message including an ID and the friend list of the file requester.

6. A non-transitory computer readable storage medium, tangibly embodying a program of instructions executable by a computer to perform a method for controlling access in a social network service, the method performed at an access control apparatus, the method comprising:
   (a) generating a core key and a plurality of sub keys by segmenting a master key unique to a file owner, the plurality of sub keys assigned differently to a plurality of groups divided according to trust level and relationship type;
   (b) determining a group to which a file requester belongs by using at least one of a friend list of the file requester, a trust level between the file requester and the file owner, and a friend list of the file owner, and distributing a sub key corresponding to the determined group to the file requester, when the file requester requests a key distribution; and
   (c) determining whether of not access to a file of the file owner is authorized by using the sub key distributed to the file requester and the core key, when the file requester requests the file,
   wherein step (c) comprises: receiving a file request message from a file requester terminal, the file request message including at least one of a file requester ID, a file owner ID, and a sub key distributed beforehand according to the trust level and the relationship type with respect to the file owner.

7. An apparatus for controlling access in a social network service, the apparatus comprising:
   a key generation part configured to generate a core key and a plurality of sub keys by segmenting a master key unique to a file owner, the plurality of sub keys assigned differently to a plurality of groups divided according to trust level and relationship type;

a key distribution part configured to determine a group to which a file requester belongs by using at least one of a friend list of the file requester, a trust level between the file requester and the file owner, and a friend list of the file owner, and distribute a sub key corresponding to the determined group to the file requester when the file requester requests a key distribution; and an authentication part configured to determine whether or not access to a file of the file owner is authorized by using the sub key distributed to the file requester and the core key, when the file requester requests the file and extract at least one of a file requester ID, a file owner ID, and a sub key distributed beforehand according to the trust level and the relationship type with respect to the file owner from a file request message received from a file terminal.

* * * * *